J. R. ROY.
SAFETY VALVE.
APPLICATION FILED JULY 9, 1914.
1,200,875.
Patented Oct. 10, 1916.
2 SHEETS—SHEET 1.
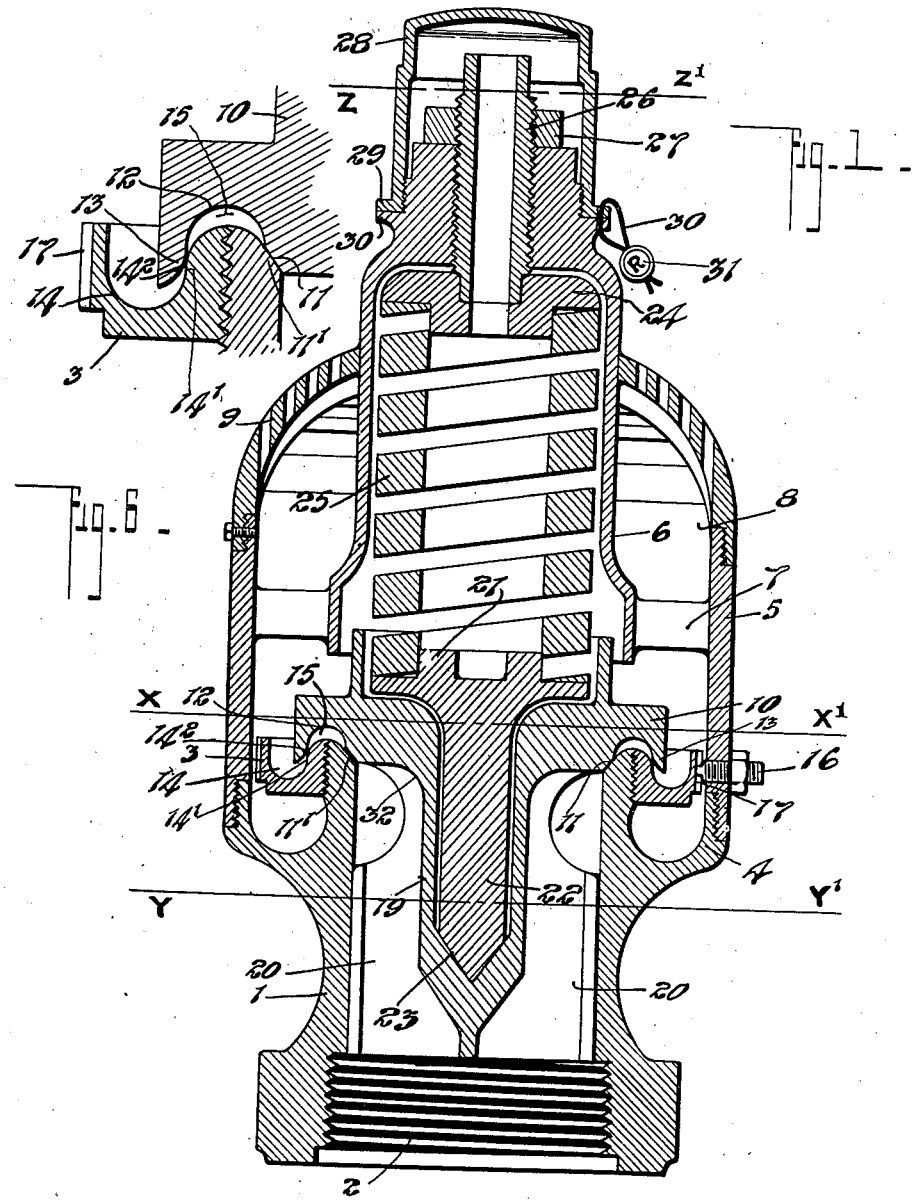
WITNESSES
INVENTOR
J. R. Roy
By
Attorney.

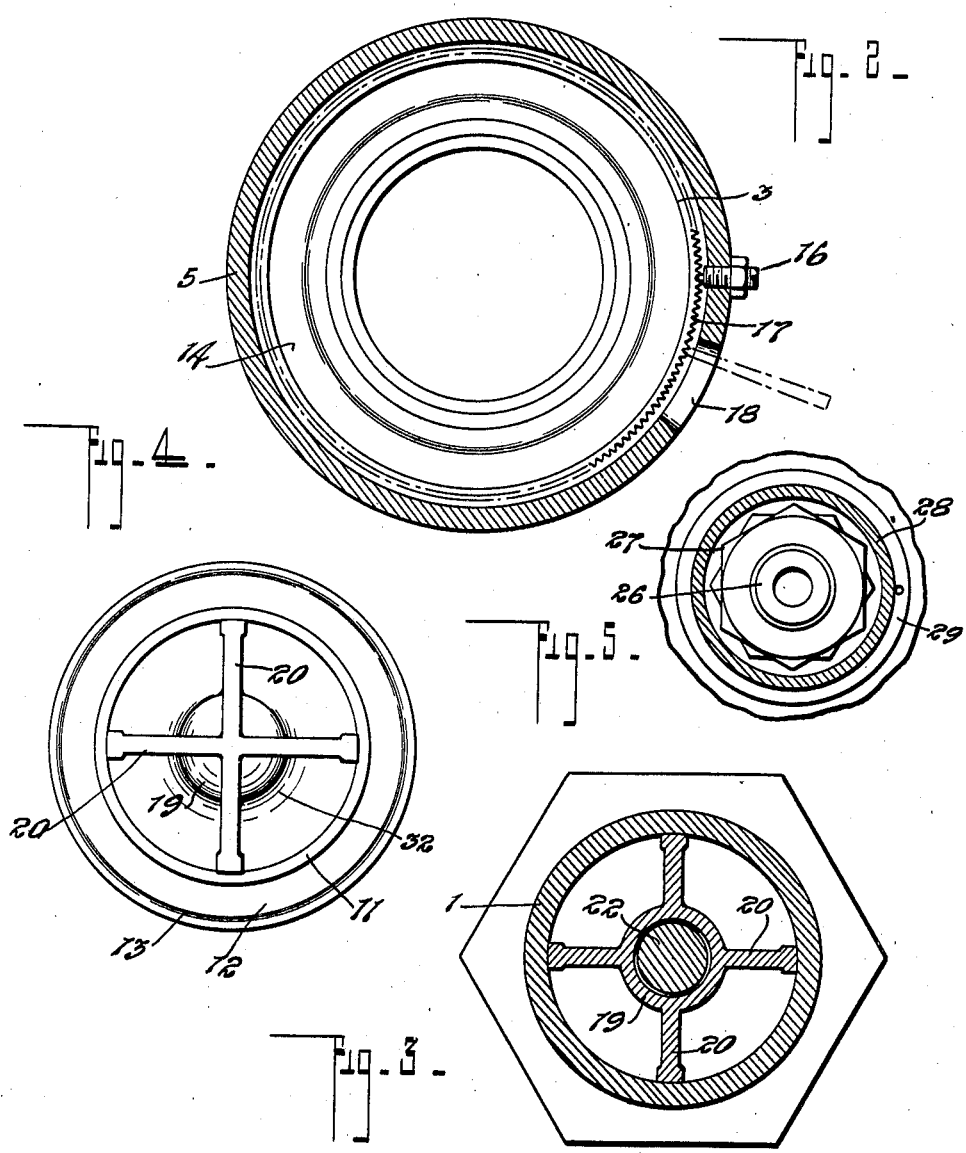

UNITED STATES PATENT OFFICE.

JAMES RAMSAY ROY, OF WINNIPEG, MANITOBA, CANADA.

SAFETY-VALVE.

1,200,875.

Specification of Letters Patent.

Patented Oct. 10, 1916.

Application filed July 9, 1914. Serial No. 849,923.

*To all whom it may concern:*

Be it known that I, JAMES RAMSAY ROY, of the city of Winnipeg, in the Province of Manitoba, Canada, have invented certain new and useful Improvements in Safety-Valves, of which the following is the specification.

The invention relates to improvements in safety appliances especially adapted for locomotive engines and the object of the invention is to provide a valve in which there is a minimum amount of friction and wear, this being accomplished by a special construction allowing proper balancing of the same under working conditions and by a special form of valve seat later explained.

A further and important object of the invention is to provide a valve construction which will allow the exhaust steam to escape in what might be termed more or less smooth paths thereby preventing the cutting of the valve by the steam.

A still further object of the invention is to provide a valve which can be readily assembled and which when assembled may be locked so that the adjustable parts cannot be tampered with.

With the above objects in view the invention consists essentially in the arrangement and construction of parts hereinafter more particularly described and later pointed out in the appended claim, reference being had to the accompanying drawings in which:

Figure 1 represents a vertical sectional view through the complete valve. Fig. 2 represents a horizontal sectional view through the same, the section being taken in the plane denoted by the line X—X' Fig. 1. Fig. 3 represents a horizontal sectional view through the valve, the section being taken in the plane denoted by the line Y—Y' Fig. 1. Fig. 4 represents an inverted plan view of the valve. Fig. 5 is a horizontal sectional view through the valve, the section being taken in the plane denoted by the line Z—Z' Fig. 1. Fig. 6 is an enlarged detailed vertical sectional view through a portion of the valve and seat.

In the drawings like characters of reference indicate corresponding parts in each figure.

1 represents a valve boxing which has the lower end thereof screw threaded at 2 to receive the ordinary boiler nipple (not shown) and the upper end thereof screw threaded to receive the regulating ring 3 later described in detail.

The body of the boxing carries a projecting exteriorly threaded flange 4 which supports the main casing of the appliance formed from an outer cylinder 5 and an inner cylinder 6 connected one to the other by intervening cross webs 7 and providing between them an annular exhaust chamber 8.

9 is a suitable perforated dome having the lower edge screw threaded to the upper end of the cylinder 5 and the upper edge making a sliding joint with the body of the cylinder 6.

10 is a valve supplied with an inner coned face 11 arranged to seat on the valve seat 11' formed at the upper end of the valve boxing and provided on the under side with a more or less semi-circular groove 12, the inner side of the groove meeting the coned face 11 while the outer side is projected in a vertical wall 13 for a purpose later apparent.

The regulating ring is supplied on the upper face with a more or less semi-circular groove 14, the inner side of which is projected for a short distance in a straight wall 14' and then falls off in a smooth curve to the inner edge of the ring. The walls 13 and 14' form between them an annular exhaust passage $14^2$ from the more or less crescent shaped chamber 15 appearing between the under face of the valve and the ring. This chamber is at all times open to the interior of the casing through the passage $14^2$ and opens to the interior of the valve boxing when the valve rises and the valve face 11 passes away from the seat.

The casing carries an adjusting screw 16 having the inner end thereof designed to engage with teeth 17 formed on the outer face of the regulating ring. There is also an opening 18 formed in the casing to the side of the screw which allows one to turn the regulating ring from the exterior upon the adjusting screw being withdrawn from engagement with the teeth.

The valve is provided with a hollow socket 19 which carries a number of similar wings 20, the wings making sliding contact with the inner face of the valve boxing and centering the valve in the same.

21 is a spring pad carried by the valve and fitted with an extending stem 22 which is received within the socket 19 and has the lower end thereof brought to a coned point 23 which seats on the lower end of the socket, the said seat having a location more or less midway of the length of the wings 20.

24 is a top spring pad contained within the upper end of the cylinder 6 and 25 is a helical spring interposed between the pads 21 and 24 and operating to hold the valve down against steam pressure.

The head of the cylinder 6 carries an adjusting screw 26 screw threaded into and through the head and having the lower end thereof set in the pad and the upper end thereof fitted with a lock nut 27.

28 is a cap inclosing the adjusting screw 26 and provided with an out-turned flange 29 which bears on a further flange 30 presented by the upper end of the cylinder 6. The said flanges are fitted with registering openings for the reception of a wire 30 whereby the cap can be locked in position by means of a seal 31 or such like applied on the ends of the wire.

I wish it to be noted that the angle at the base of the socket is well rounded as indicated at 32 so that the steam is deflected in a smooth path to the valve seat 11' thereby preventing the cutting of the valve at this point owing to the velocity of the steam.

When the valve is applied on a boiler the spring is regulated to whatever blow off pressure is desired this being accomplished by removing the cap 28 and screwing the screw 26 up or down. Once the spring is set the cap is replaced and locked by means of the seal so that it cannot be tampered with. The regulating ring is then set to control the seating of the valve once the same has been forced open by the steam pressure in the boiler.

In connection with the regulating ring it will be seen that owing to the peculiar construction of the walls 13 and 14' it is possible for the valve to rise considerably from the seat 11' without increasing the cross sectional area of the passage $14^2$, the distance which the valve can rise without increasing the cross sectional area of the passage being controlled by the adjustment given the ring. If the ring is screwed well up then the valve will have to rise high before the cross sectional area of the passage will increase while if the ring be screwed well down the cross sectional area of the passage $14^2$ will increase proportionately with the valve opening upon the valve rising. I am accordingly able by adjusting the ring, to time so to speak, the reseating of the valve. With the ring in the position shown in the drawings, that is well up, it will be seen that immediately the valve is raised under the action of steam pressure the steam will escape through the valve opening to the chamber 15 and as the valve opening at this time will be considerably larger in cross sectional area than the passage $14^2$ there will be a pressure built up in the chamber which will serve to retain the valve open against the action of the spring until the built up pressure has been reduced by the retarded escape of the steam through the passage sufficient to allow the valve to seat. In this way I can control the reseating of the valve by the adjustment of the ring.

I wish to call especial attention to the more or less smooth path which I have provided for the escaping steam, there being no right angled corners to cause wearing of the parts owing to the steam velocity.

Attention is also called to the manner in which the valve is balanced. It will be seen in examining the drawings that the wings 20 are long and prevent the valve from toppling, so to speak, this action being further minimized by the fact that the lower spring pad directly acted upon by the spring seats in the valve socket at a point more or less midway of the length of the wings.

What I claim as my invention is—

The combination with a valve boxing provided at the upper end with an outwardly flaring coned valve seat, of a valve slidably mounted in the boxing and provided on the underside with a coned valve face normally engaging the seat and having further, in the underface thereof and between the valve face and the outer side of the valve, a substantially semi-circular continuous groove with the inner side of the groove meeting the valve face and the outer side of the groove projecting into a vertical wall which terminates in an outward flare to the outer side of the valve, the said groove receiving the upper extremity of the valve boxing normally projected into the groove beyond the valve face and an adjustable regulating ring screw threaded onto the upper end of the boxing and provided on the top side with a substantially semi-circular continuous groove the inner side of which projects for a short distance into a straight wall contained within and spaced from the straight wall of the former groove and terminating at the top end in a smooth curve toward the boxing, such latter groove being normally continuous with the upper end of the boxing which projects beyond the valve face.

Signed at Winnipeg this 14th day of November, 1913.

JAMES RAMSAY ROY.

In the presence of—
G. S. ROXBURGH,
R. FOSTER.